(12) United States Patent  (10) Patent No.: US 9,235,215 B2
Qian et al.  (45) Date of Patent: Jan. 12, 2016

(54) FEATURE SET OPTIMIZATION IN VISION-BASED POSITIONING

(71) Applicant: Honeywell International Inc., Morristown, NJ (US)

(72) Inventors: Gang Qian, Plymouth, MN (US); Mahesh K. Jeerage, New Brighton, MN (US); Yunqian Ma, Plymouth, MN (US)

(73) Assignee: Honeywell International Inc., Morris Plains, NJ (US)

(*) Notice: Subject to any disclaimer, the term of this patent is extended or adjusted under 35 U.S.C. 154(b) by 0 days.

(21) Appl. No.: 14/244,658

(22) Filed: Apr. 3, 2014

(65) Prior Publication Data

US 2015/0286217 A1  Oct. 8, 2015

(51) Int. Cl.
  *G06T 9/00*  (2006.01)
  *G05D 1/02*  (2006.01)
  *G06K 9/00*  (2006.01)
  *G06K 9/62*  (2006.01)

(52) U.S. Cl.
  CPC .......... *G05D 1/0246* (2013.01); *G06K 9/00791* (2013.01); *G06K 9/6212* (2013.01)

(58) Field of Classification Search
  None
  See application file for complete search history.

(56) References Cited

U.S. PATENT DOCUMENTS

| | | | |
|---|---|---|---|
| 5,760,737 A | 6/1998 | Brenner | |
| 5,835,910 A | 11/1998 | Kavanagh et al. | |
| 6,067,369 A | 5/2000 | Kamei | |
| 6,243,492 B1 | 6/2001 | Kamei | |
| 6,516,099 B1 | 2/2003 | Davison et al. | |
| 6,597,801 B1 | 7/2003 | Cham et al. | |
| 6,795,567 B1 | 9/2004 | Cham et al. | |
| 6,970,591 B1 | 11/2005 | Lyons et al. | |
| 7,130,454 B1 | 10/2006 | Berube et al. | |
| 7,177,486 B2 | 2/2007 | Stewart | |
| 7,489,806 B2 | 2/2009 | Mohri et al. | |
| 7,630,517 B2 | 12/2009 | Mirowski et al. | |
| 7,706,603 B2 | 4/2010 | Najafi | |
| 7,809,722 B2 | 10/2010 | Gokturk et al. | |
| 8,170,280 B2 | 5/2012 | Zhao et al. | |
| 8,170,379 B2 | 5/2012 | Shiiyama et al. | |
| 8,447,116 B2 | 5/2013 | Ma et al. | |
| 8,660,338 B2 | 2/2014 | Ma et al. | |
| 8,855,712 B2 * | 10/2014 | Lord | G06F 17/30244 348/222.1 |
| 9,036,925 B2 * | 5/2015 | Vaddadi | G06F 17/30247 382/225 |
| 2001/0038718 A1 | 11/2001 | Kumar et al. | |
| 2002/0060784 A1 * | 5/2002 | Pack | G01S 7/481 356/6 |

(Continued)

OTHER PUBLICATIONS

U.S. Patent and Trademarl Office, "Notice of Allowance", "from U.S. Appl. No. 13/188,836", Mar. 6, 2013, pp. 1-7, Published in: US.

(Continued)

*Primary Examiner* — Tsung-Yin Tsai
(74) *Attorney, Agent, or Firm* — Fogg & Powers LLC

(57) ABSTRACT

In one embodiment, a method for optimizing a set of matched features is provided. The method includes matching features between an optical image and a geo-referenced orthoimage to produce an initial set of matched features. An initial position solution is then determined for the optical image using the initial set of N matched features. The initial set of N matched features are then optimized based on a set of N sub-solutions and the initial position solution, wherein each of the N sub-solutions is a position solution using a different set of (N−1) matched features. A refined position solution is then calculated for the optical image using the optimized set of matched features.

20 Claims, 7 Drawing Sheets

(56) References Cited

U.S. PATENT DOCUMENTS

| | | | | |
|---|---|---|---|---|
| 2007/0014488 | A1* | 1/2007 | Chen | G06K 9/0063 |
| | | | | 382/294 |
| 2007/0236561 | A1* | 10/2007 | Anai | G06T 7/0044 |
| | | | | 348/46 |
| 2008/0059065 | A1 | 3/2008 | Strelow et al. | |
| 2009/0213112 | A1 | 8/2009 | Zhu | |
| 2009/0245653 | A1* | 10/2009 | Kochi | G06T 3/4038 |
| | | | | 382/203 |
| 2011/0043402 | A1* | 2/2011 | Sasakawa | G01C 11/02 |
| | | | | 342/25 A |
| 2012/0243775 | A1* | 9/2012 | Ma | G06T 7/0075 |
| | | | | 382/154 |
| 2012/0257050 | A1* | 10/2012 | Simon | G01S 11/12 |
| | | | | 348/135 |
| 2013/0022233 | A1* | 1/2013 | Ma | G01S 5/16 |
| | | | | 382/103 |

OTHER PUBLICATIONS

U.S. Patent and Trademark Office, "Office Action", "from U.S. Appl. No. 13/188,836", Dec. 5, 2012, pp. 1-11, Published in: US.

McIlroy, "Deterministic sample consensus with multiple match hypotheses", "British Machine Vision Conference", Aug. 31, 2010, Publisher: BMVC.

Nister, "Visual Odometry", "Proceedings of the 2004 IEEE Computer Society Conference on Computer Vision and Pattern Recognition", Jun. 27, 2004, pp. 1-8, vol. 1, Publisher: CVPR, Published in: Washington D.C.

Qian et al., "A Method of Using Image Warping to Improve Geo-Registration Feature Matching in Vision-Aided Positioning", "U.S. Appl. No. 14/153,495, filed Jan. 13, 2014", pp. 1-34.

European Patent Office, "Communication Under Rule 71(3) from EP Application No. 12176018.5 mailed Jan. 7, 2014", "from Foreign Counterpart of U.S. Appl. No. 13/188,836", Jan. 7, 2014, pp. 1-37, Published in: EP.

European Patent Office, "European Search Report from EP Application No. 12176018.5 mailed Jan. 3, 2013", "from Foreign Counterpart of U.S. Appl. No. 13/188,836", Jan. 3, 2013, pp. 1-4, Published in: EP.

European Patent Office, "Extended European Search Report from EP Application No. 15160144.0 mailed Aug. 26, 2015", "from Foreign Counterpart of U.S. Appl. No. 14/244,658", Aug. 26, 2015, pp. 1-8, Published in: EP.

Brown et al., "Unsupervised 3D Object Recognition and Reconstruction in Unordered Datasets", "Proceedings of the Fifth International Conference on 3-D Digital Imaging and Modeling (3DIM'05)", Jun. 13-16, 2005, pp. 56-63.

Girod et al., "Mobile Visual Search", "IEEE Signal Processing Magazine", Jul. 2011, pp. 61-76, vol. 28, No. 4.

Samadzadegan et al., "Position Estimation of Aerial Vehicle Based on a Vision Aided Navigation System", "Joint Workshop Visualization and Exploration of Geospatial Data", Jun. 27, 2007, pp. 1-6.

Wang et al., "The Normalized Sift Based on Visual Matching Window and Structural Information for Multi-Optical Imagery Registration", "2010 IEEE International Geoscience and Remote Sensing Symposium", Jul. 25, 2010, pp. 999-1002.

Zheng et al., "Revisiting the PnP Problem: A Fast, General and Optimal Solution", "2013 IEEE International Conference on Computer Vision", Dec. 1, 2013, pp. 2344-2351, Publisher: IEEE Computer Society.

* cited by examiner

FEATURE SET OPTIMIZATION IN VISION-BASED POSITIONING

BACKGROUND

Vision-aided navigation extracts features from an image and performs feature matching with a geo-referenced image. The objective of the feature matching is to provide accurate tracked features as the measurement of a navigation solution (e.g., position, velocity, and attitude). For example, in a geo-reference vision-aided navigation situation, good feature matching between a captured image and geo-referenced imagery increases the accuracy of the subsequent vision-aided positioning. Good feature matching will generate accurate positioning results, while bad feature matching with large errors will reduce the accuracy of a navigation solution. In general, it is desirable to use only the good matched features.

SUMMARY

In one embodiment, a method for optimizing a set of matched features is provided. The method includes matching features between an optical image and a geo-referenced orthoimage to produce an initial set of matched features. An initial position solution is then determined for the optical image using the initial set of N matched features. The initial set of N matched features are then optimized based on a set of N sub-solutions and the initial position solution, wherein each of the N sub-solutions is a position solution using a different set of (N−1) matched features. A refined position solution is then calculated for the optical image using the optimized set of matched features.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

The subject matter described herein provides for an intermediate step between feature matching and a final position solution to improve the feature matching quality and hence the positioning accuracy by optimizing a set of matched features. The objective of the intermediate step is to remove one or more bad matches from the set of matched features while retaining good matches for positioning.

Figure 1:
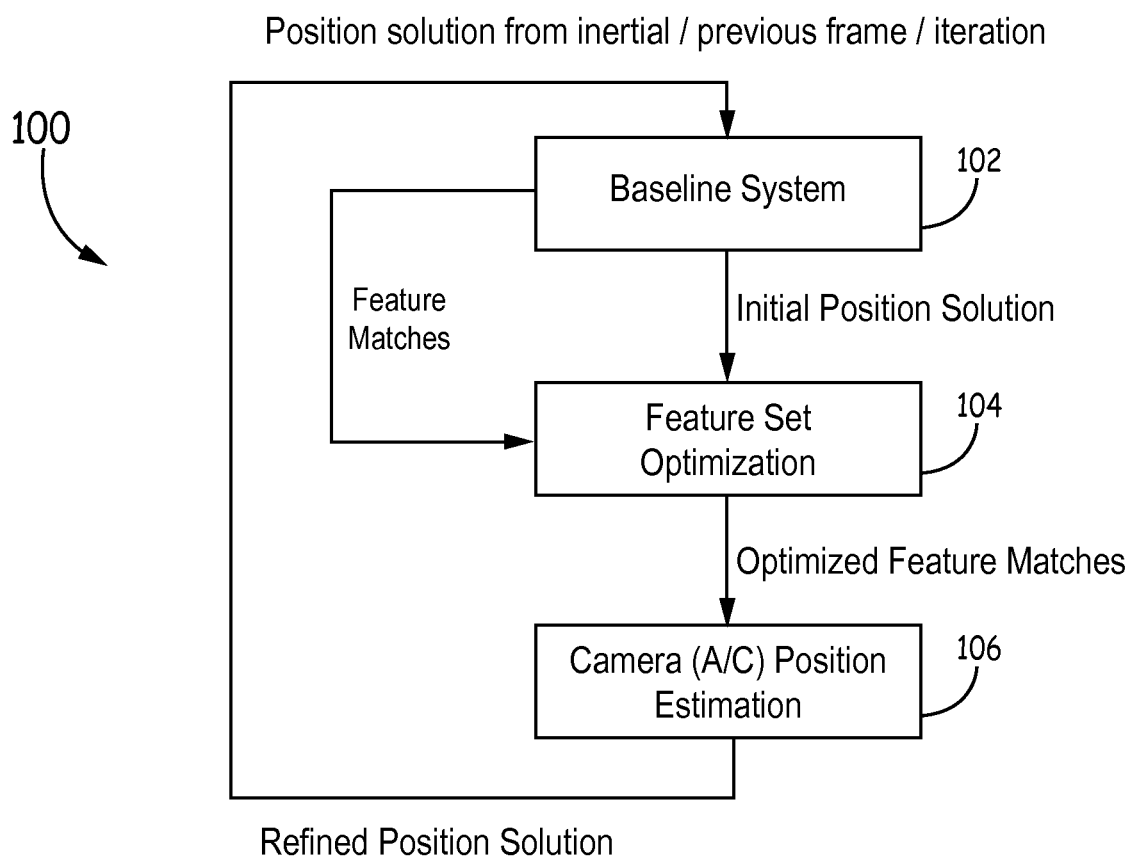
FIG. 1 is a flow diagram of an example method for determining a position solution including a method of optimizing a set of matched features.

FIG. 1 is flow diagram of a method 100 for determining a position solution using such a method 104 of optimizing a set of matched features. Method 100 uses an image from the image capturing device and correlates it with a geo-referenced orthoimage to determine a position solution. This position solution can be used in a larger navigation system to determine a navigation solution for a vehicle. Such a navigation solution can be determined by an integrated navigation system that uses information from one or more of an inertial measurement unit (IMU), a GNSS receiver, magnetic sensor, range sensor, and/or other sensor in addition to the image capturing device. The navigation solution can include a position, velocity, and attitude for the vehicle. The position of the navigation solution may be the same or different than the position solution determined in method 100 depending on how the information from the various sensors is merged. An example of such a navigation system is a vision-aided navigation system. Method 100 is an example of determining a position solution used in a navigation system. As such, method 100 is repeated with successive images captured by the image capturing device to continually update the position solution for navigation purposes.

An iteration of method 100 starts with a position solution from a previous iteration of the method 100. In examples where method 100 is part of a larger integrated navigation system, the position solution can be a position from a navigation solution of a previous iteration. In examples where method 100 is in a standalone system, the position solution can be a position solution determined without information from other sensors such as an IMU, a GNSS receiver, range sensor, or magnetic sensor.

In the current iteration, an initial position solution can be determined (block 102) based on the position solution from the previous iteration of method 100. As mentioned above, the initial position solution is a position solution updated in time (based on the newly captured optical image) from the position solution of the previous iteration. In an example, since the position solution is determined based on a 2-dimensional image, the position solution is a 2-dimensional (e.g., a latitude and longitude) position estimate. To determine the initial position solution, an optical image is captured for the current iteration by the image capturing device. The optical image is a 2-dimensional (2D) image that captures a representation of color in the field of view of the image capturing device. The representation of color can include a black and white representation, grayscale representation, or another color palette representation including any number of colors. The image capturing device can include a digital camera, film camera, digital sensor, charge-coupled device or other image-capturing device that is capable of capturing images. In some embodiments, the image capturing device can include one device configured to capture a single image per iteration of method 100. In other embodiments, however, the image capturing device can include multiple devices configured to capture multiple images per iteration of method 100.

A plurality of features can be extracted from the optical image and compared to features in a geo-referenced orthoimage. Features can be extracted using any appropriate method including one or more of a scale-invariant feature transform (SIFT) extraction algorithm, a speed-up robust feature (SURF) extraction algorithm, a Kanade Lucas Tomasi (KLT) extraction algorithm, and the like. This process generates a plurality of matched features between the optical image captured by the image capturing device and the geo-reference orthoimage. Matching features can include refining the plurality of matched features using an algorithm known to one having skill in the art. For example, matching errors can be removed using random sample consensus (RANSAC) or an iteration thereof.

In any case, a set of N matched features is identified and is used to determine the initial position solution based on the position solution from the previous iteration. The initial position solution can be determined using any appropriate method now known or later developed that determines a position solution based on a set of matched features between an optical image and a geo-referenced orthoimage. The initial position solution can be the output (i.e., the "final") position solution of a position solution algorithm. Any appropriate position solution algorithm can be used such as the perspective-n-point (PnP) algorithm. The initial position solution can be determined using an appropriate system, referred to herein as a "baseline system". In an example, the initial position solution is an estimated position for a vehicle on which the image capturing device is mounted at the time in which the optical image was captured.

The set of N matched features is then optimized (block 104) based on the initial position solution. As mentioned above, optimizing the initial positioning removes bad matched features from the set of N matched features and retains good matched features to produce an optimized set of matched features. As matched features are only removed not added, the optimized set of matched features is a subset of the set of N matched features used to determine the initial position solution.

A refined position solution is then determined using the optimized set of matched features (block 106) and a position solution algorithm such as the PnP algorithm. The refined position solution can be determined using any appropriate algorithm such as the PnP algorithm mentioned above with respect to block 102. The refined position solution is determined for the same time/iteration as the initial position solution. That is, the refined position solution is based on the same input data (optical image and previous position solution) as the initial position solution. Accordingly, the initial position solution and the refined position solution correspond to the same point in time for navigation of a vehicle. Notably, however, the refined position solution is based on the optimized set of matched features and, therefore, should be more accurate than the initial position solution.

In examples where method 100 is part of a larger navigation system, the refined position solution can be provided to a larger navigation system and can be integrated with measurements from other sensing devices to determine a navigation solution for a vehicle. This navigation solution can then be input back into method 100 to begin another iteration. In examples where method 100 is in a standalone system, the refined position solution can be used as appropriate and can be input back into method 100 to begin another iteration.

Figure 2:
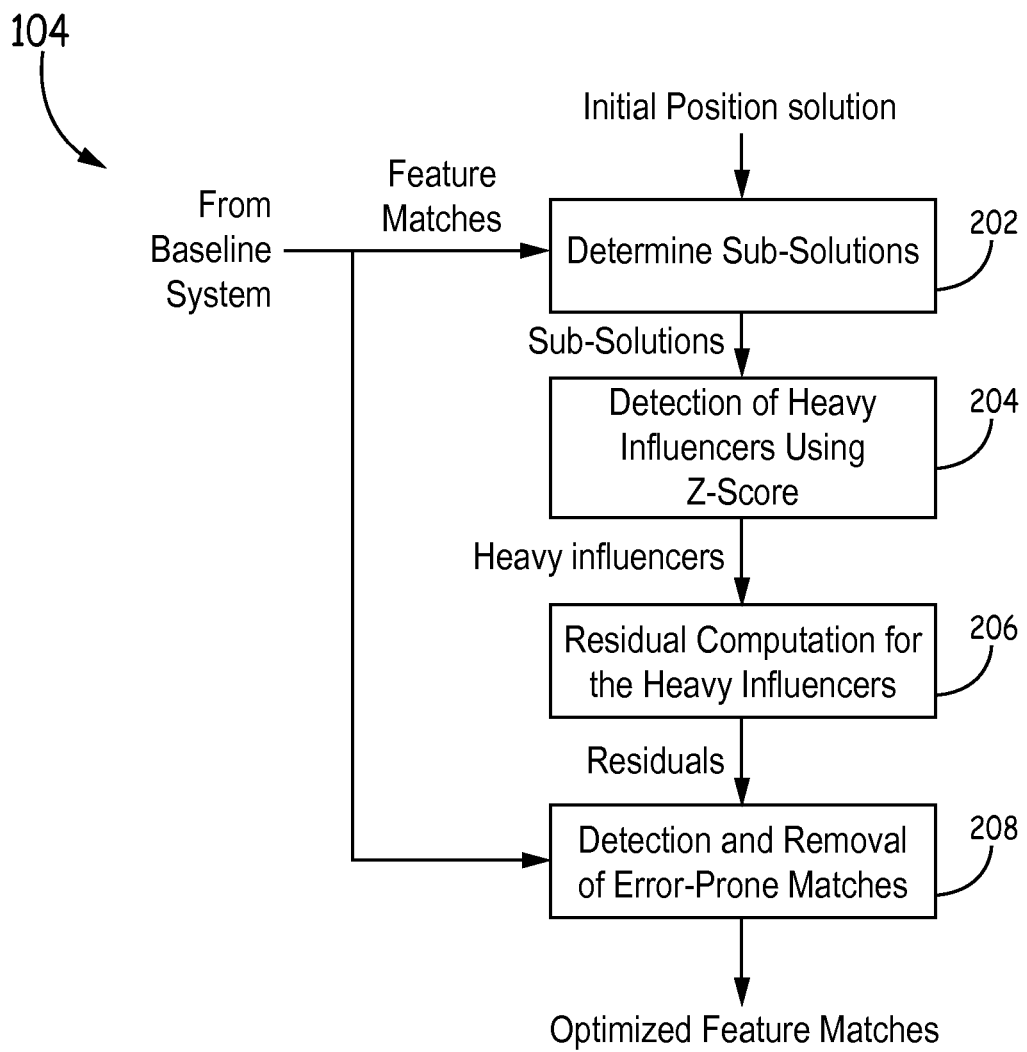
FIG. 2 is a flow diagram of an example method for optimizing a set of matched features for use in the method of FIG. 1.

FIG. 2 is a flow diagram of an example method 104 for optimizing a set of N matched features. As discussed above, an initial position solution and the set of N matched features used to determine that initial position solution are obtained from a position solution algorithm. A set of N sub-solutions are then determined based on the same position solution algorithm as used to determine the initial position solution and the set of N matched features (block 202). Each of the sub-solutions is a position solution determined based on the set of N matched features having a different one of the matched features excluded. A Z-score is then calculated for each sub-solution, using the set of N sub-solutions as the population for the Z-score (block 204). A residual is then calculated for each sub-solution having a Z-score above a Z-threshold (block 206). Each residual is based on a distance between a location of each feature in a set of features in the optical image and a predicted location of the feature according to the respective sub-solution for that residual. If any residuals are less than a threshold, the matched feature corresponding to the sub-solution for that residual is excluded from the set of N matched features to produce an optimized set of matched features (block 208). This optimized set of matched features is then used to determine a refined position solution as described with respect to block 106 of method 100. Each of the blocks 202, 204, 206, 208 is described in greater detail below.

Figure 3:
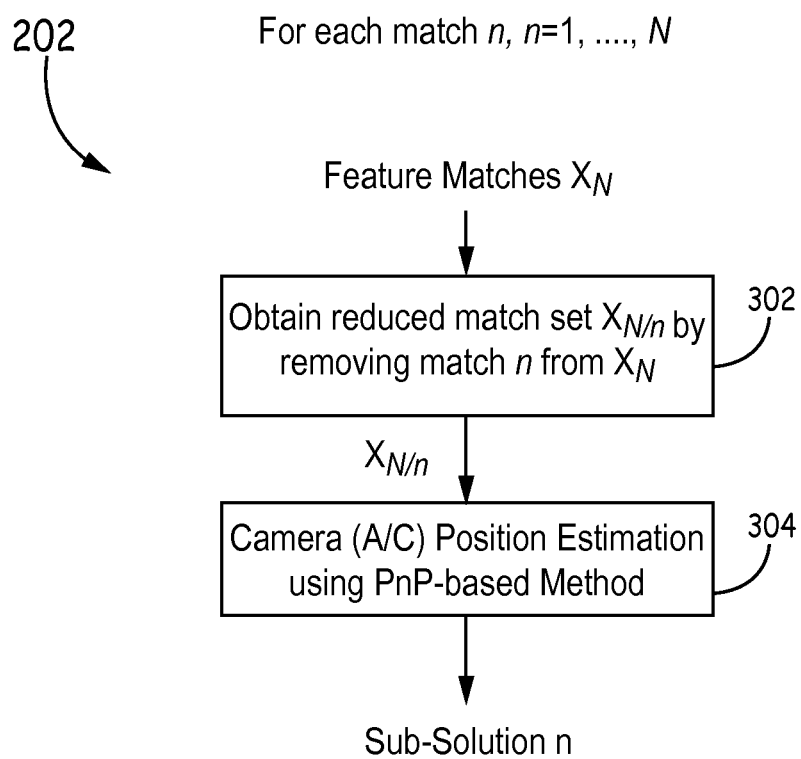
FIG. 3 is a flow diagram of an example method of determining a set of N sub-solutions from an initial position solution and a set of N matched features used to determine that initial position solution in the method of FIG. 2.

FIG. 3 is a flow diagram of an example method 202 of determining a set of N sub-solutions from an initial position solution and a set of N matched features used to determine that initial position solution. To determine the set of N sub-solutions, N subsets of the set of matched features can be generated (block 302). Each subset of matched features is the set of N matched features with a different one of the matched features removed which results in N subsets of matched features. The set of N sub-solutions is then determined by determining a respective position solution using an appropriate position solution algorithm such as the PnP algorithm for each respective subset of matched features (block 304). Thus, each sub-solution is determined using a different subset of (N−1) matched features, each such subset of (N−1) matched features being a subset of the N matched features used to determine the initial position solution. For example, a first sub-solution is a position solution determined with a first subset of matched features having a first matched feature of the set of matched features excluded; a second sub-solution is a position solution determined with a second subset of matched features having a second matched feature of the set of matched features excluded; and so on. The sub-solutions can be determined using any appropriate position solution algorithm such as the PnP algorithm discussed above.

Figure 4:
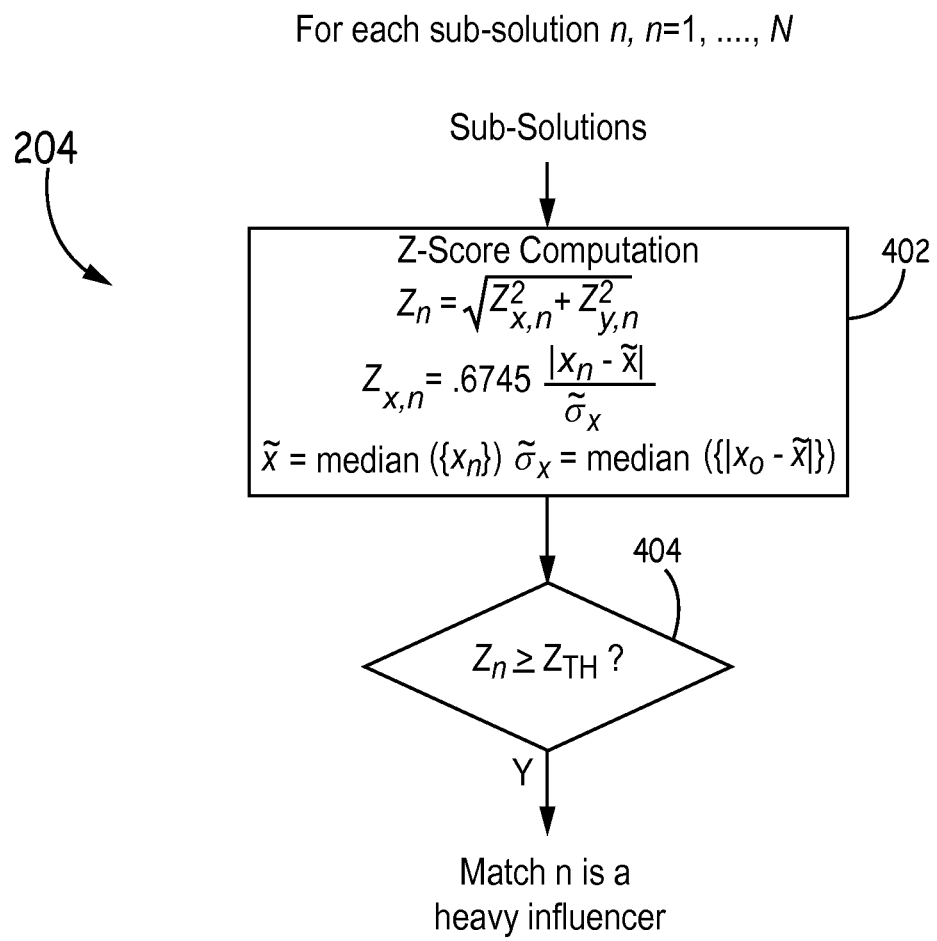
FIG. 4 is a flow diagram of an example method of calculating a Z-score for each sub-solution in the set of N sub-solutions determined in the method of FIG. 3.

FIG. 4 is a flow diagram of an example method 204 of calculating a Z-score for each sub-solution in the set of N sub-solutions. As known, a Z-score is a standard score; therefore, a Z-score is calculated for each sub-solution to determine which, if any, sub-solutions are outliers in the set of N sub-solutions. The Z-score is calculated based off of the position estimate of each sub-solution. In examples where the position estimate is 2-dimensional, the Z-score can be calculated off of the 'x' (e.g., latitude) and 'y' (e.g., longitude) coordinates.

In an example, to calculate a Z-score (block 402), the median of the x coordinates and the median of the y coordinates are calculated using the x coordinates and the y coordinates of the set of N sub-solutions as the population. The standard deviation of the x coordinates and the standard deviation of the y coordinates is then calculated using the x coordinates and the y coordinates of the set of N sub-solutions as the population as well as the median of the x coordinates and the median of the y coordinates. In an example, a Z-score for a respective sub-solution can be calculated from these medians and standard deviations by calculating an x coordinate Z-score and a y coordinate Z-score for the respective sub-solution. The x coordinate Z-score can be calculated based on the x coordinate of the respective sub-solution, the x coordinate median, and the x coordinate standard deviation. The y coordinate Z-score can be calculated based on the y coordinate of the respective sub-solution, the y coordinate median, and the y coordinate standard deviation. The Z-score for the respective sub-solution can then be calculated by taking the square root of the x coordinate Z-score squared plus the y coordinate Z-score squared for the respective sub-solution. Other methods may also be possible to calculate a Z-score for a respective sub-solution. This Z-score calculation is repeated with the coordinates of each sub-solution to calculate a Z-score for each sub-solution.

The Z-score for each sub-solution is then compared to a Z threshold (block 404). The Z threshold is set as the boundary to distinguish outliers among the sub-solutions. The Z threshold can be set in any appropriate manner such as based on empirical analysis. Any sub-solution having a Z-score above the Z threshold is subject to further analysis in acts 206 and 208 to determine whether to exclude the matched feature corresponding to that sub-solution. A sub-solution having a Z-score below the Z threshold is considered to fall within an acceptable range of the sub-solutions and is not analyzed further.

Blocks 202 and 204 effectively identify which matched features are heavy influencers on the initial position solution by determining which sub-solutions having a matched feature excluded therefrom differ substantially from the set of N sub-solutions. Since these matched features influence the initial position solution to a higher degree than other matched features, these matched features are likely direct the initial position solution in a different direction than the majority of the matched features and, therefore are more likely to be in error than other matched features. As such, these matched features (e.g., their corresponding sub-solutions) are analyzed further to estimate an amount of error that each such matched feature contributes to the initial position solution.

Figure 5:
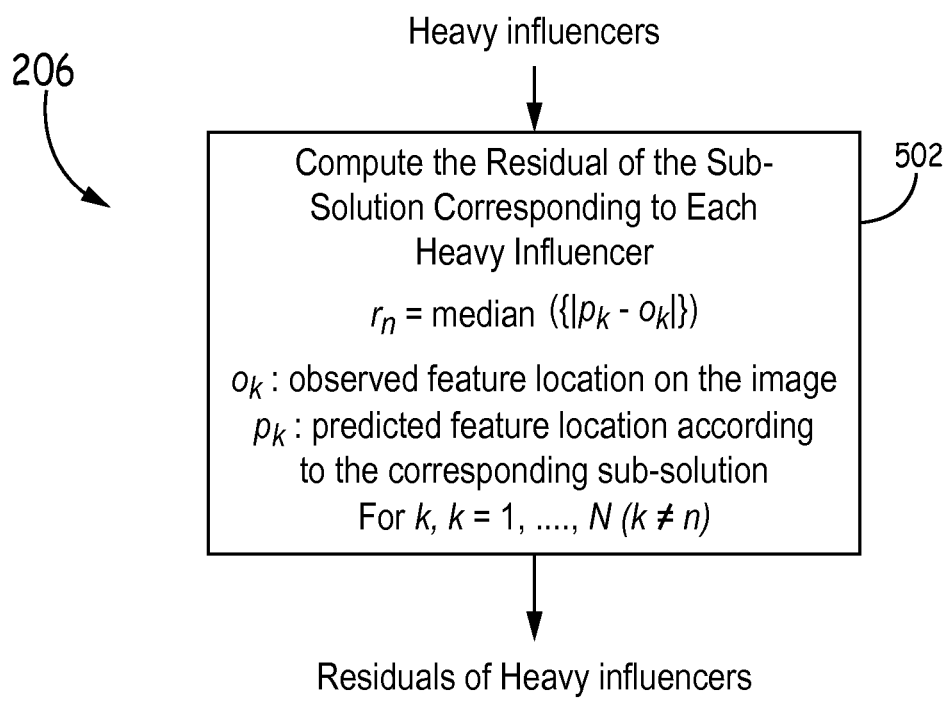
FIG. 5 is a flow diagram of an example method for calculating a residual for a sub-solution having a Z-score above a Z threshold as identified in the method of FIG. 4.

FIG. 5 is a flow diagram of an example method 206 for calculating a residual for a sub-solution. A residual is calculated for each sub-solution having a Z-score above a threshold. As mentioned above, each residual is based on a distance between a location of each feature in a set of features in the optical image and a predicted location of the feature according to the respective sub-solution for that residual. The residual provides an estimate of the amount of error produced by the matched feature corresponding to a respective sub-solution. In an example, a residual for a respective sub-solution is calculated as the median of a set of distances between a location of each feature in a set of features in the optical image and a predicted location of the feature according to the respective sub-solution for that residual (block 502). More specifically, the set of distances includes the distance between the location in the optical image of each feature in the set of features and a predicated location of that feature according to the respective sub-solution. In this way, the residual is a measure of the error in distance of the sub-solution as compared to the correct position which is represented by the optical image. In an example, the set of features used to calculate the residual is the set of N matched features used to determine the initial position solution. In another example, the set of features used to calculate the residual is the set of (N−1) matched features used to calculate the sub-solution for that residual. In other examples a different set of features can be used. Additionally, in other examples, other calculations can be used to determine a residual for a respective sub-solution. In any case, a residual is calculated for each sub-solution having a Z-score above the Z threshold as discussed with respect to FIG. 4.

Figure 6:
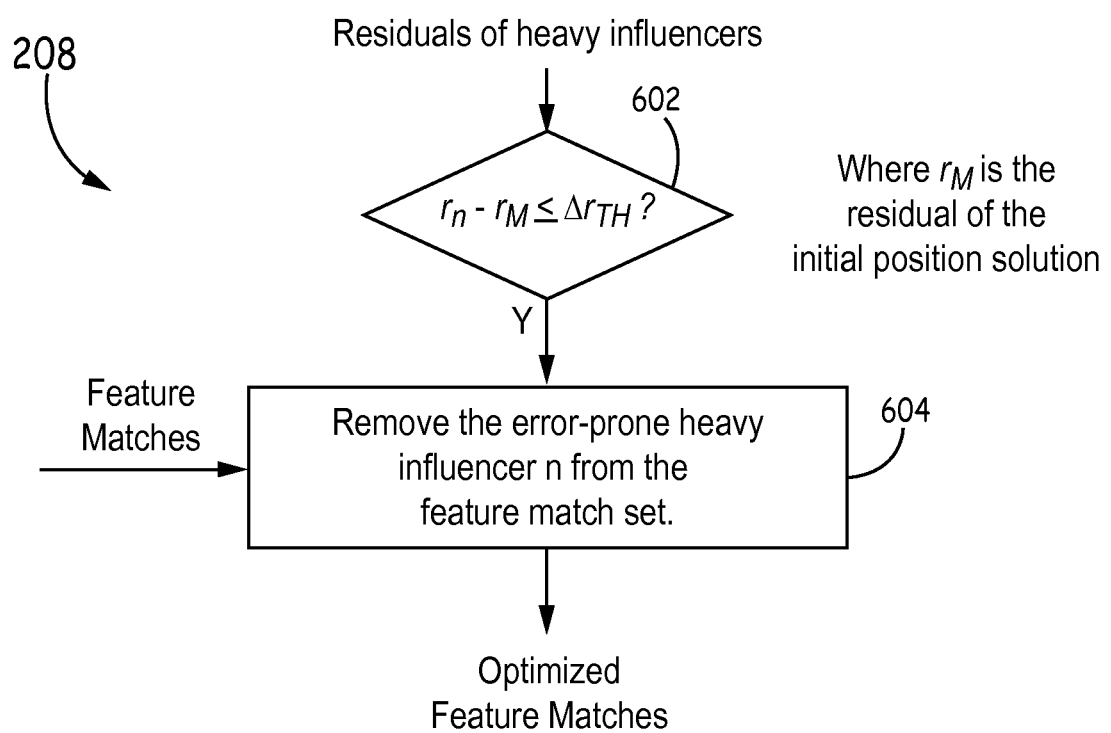
FIG. 6 is a flow diagram of an example method for excluding one or more matched features from the set of N matched features based on the corresponding residual calculated in the method of FIG. 5.

FIG. 6 is a flow diagram of an example method 208 for excluding one or more matched features from the set of N matched features. Each residual calculated in block 206 is compared to a residual threshold (block 602) to determine if the matched feature corresponding to that residual is insignificant enough to warrant excluding that matched feature. The residual threshold can be set in any appropriate manner. In an example, the residual threshold is based on a residual of the initial position solution determined by the baseline system in block 102. This residual of the initial position solution can be calculated in the same manner as the residuals for the sub-solutions discussed with respect to FIG. 5. Using the residual threshold of the initial position solution to set the residual threshold normalizes the residual of the sub-solution to the residual of the initial position solution.

In an example, the difference between the residual for a respective sub-solution and the residual for the initial position solution is compared to the threshold. Of course, this is mathematically the same as comparing the residual of a respective sub-solution to the residual of the initial position solution plus a constant. Accordingly, such calculations are included within any language implying a comparison between a residual and a residual threshold used herein. If the difference between the residual for the respective sub-solution and the residual for the initial position solution is less than the residual threshold, the matched feature corresponding to the sub-solution for that residual is excluded from the set of N matched features to produce an optimized set of matched features (block 604). This is because if the difference between the residual of the respective sub-solution and the initial position solution is small, then the matched feature that was excluded when determining the respective sub-solution does not contribute a large positive effect on the error and, therefore, can be excluded. The matched feature corresponding to a respective sub-solution is the matched feature that was excluded from the set of N matched features when determining that sub-solution. The residual for each sub-solution having a Z-score above the Z threshold is compared against the residual threshold in this manner. The matched feature corresponding to any such sub-solution having a residual less than the residual threshold is excluded from the set of N matched features resulting in an optimized set of matched features. This optimized set of matched features is used to determine a refined position solution as discussed with respect to block 106 above.

The feature set optimization discussed herein provides a two-stage process to determine which, if any, matched features to exclude. The first stage includes blocks 202 and 204 and identifies any sub-solutions (determined with a respective matched feature excluded) are outliers among the set of N sub-solutions. This first stage identifies which matched features are heavy influencers on the initial position solution. Only sub-solutions (and their corresponding matched features) meeting this Z threshold are analyzed further. The second stage includes blocks 206 and 208 where the outlying sub-solutions identified in stage one are further analyzed to estimate how much error corresponds to the matched feature excluded in the sub-solution. If the amount of error in a sub-solution is less than or only slightly larger than the error of the initial position solution, then that sub-solution is presumably better or not much worse than the initial position solution providing evidence that the corresponding matched feature provided little benefit or a negative benefit (i.e., in regards to accuracy) to the initial position solution. The corresponding matched feature, therefore, is a good candidate to exclude. If the amount of error in the sub-solution is substantially larger than the error of the initial position solution, then that sub-solution is significantly worse than the initial position solution, providing evidence that the corresponding matched feature provided a significant positive (i.e., closer to accurate) benefit to the initial position solution. Therefore, the corresponding matched feature is beneficial and should not be excluded. In this way, one or more bad matched features can be identified and excluded from a set of N matched features.

Figure 7:
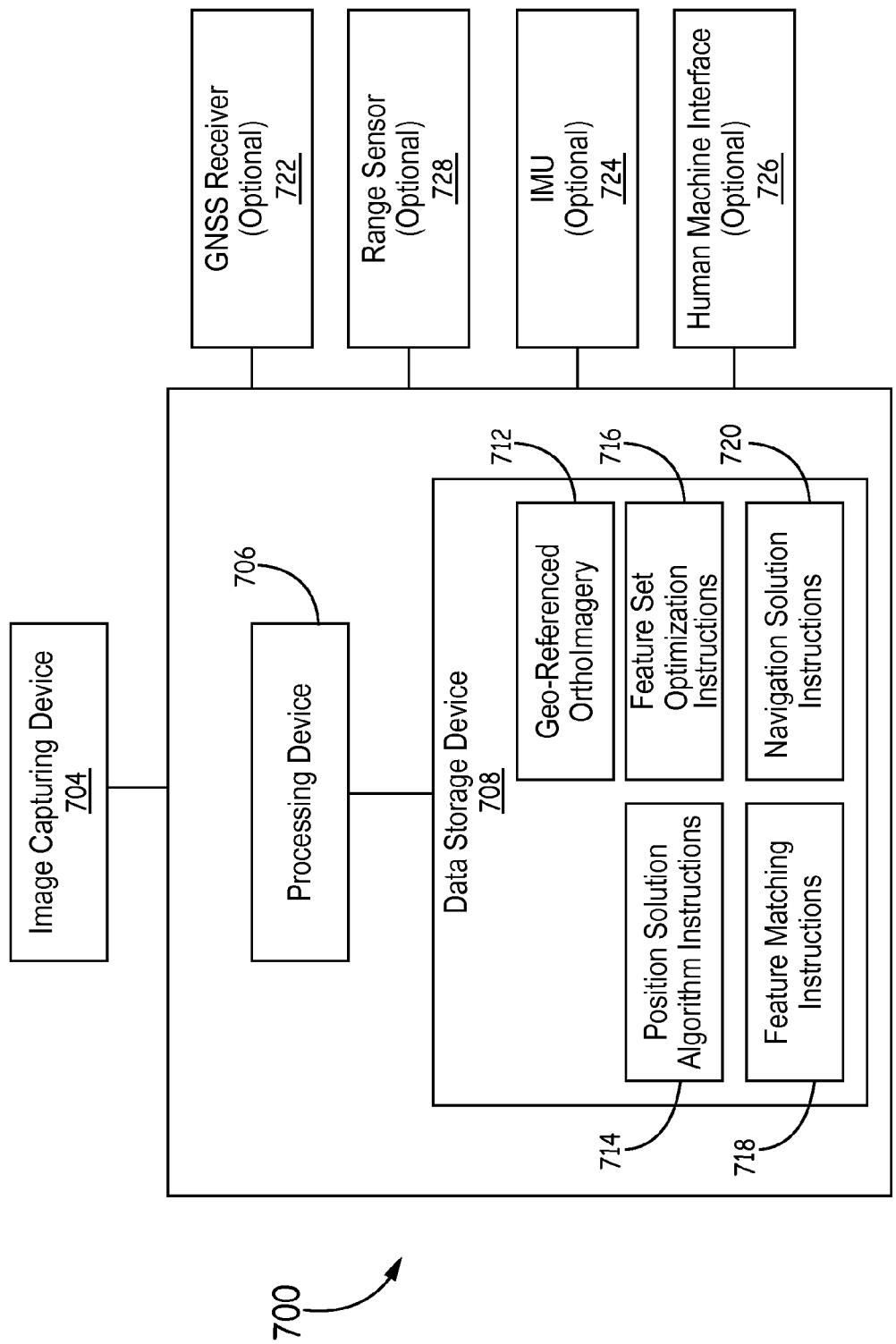
FIG. 7 is a block diagram of an example system for determining a position solution including a method of optimizing a set of matched features.

FIG. 7 is a system 700 configured to implement the methods described above to determine a position solution and optimize a set of matched features. The system 700 includes one or more image capturing devices 704 configured to capture at least one optical image, coupled to one or more processing devices 706 which are coupled to one or more data storage devices 708 configured to store geo-referenced orthoimagery 712. In at least one implementation, the one or more processing devices 708 is a programmable device that processes data received from the image capturing device 704 as directed by instructions stored on the one or more data storage devices 708. The one or more data storage devices 708 include instructions 714-720 which, when executed by the one or more processing devices 706, cause the one or more processing devices 706 to implement the methods described above.

In certain embodiments, the one or more processing devices 706 can include a central processing unit (CPU), microcontroller, microprocessor (e.g., a digital signal processor (DSP)), field programmable gate array (FPGA), application specific integrated circuit (ASIC), or other processing device. In certain embodiments, the one or more data storage devices 708 include a non-volatile electronic hardware device for storing machine readable data and instructions. In one embodiment, the one or more data storage devices 708 store information on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc.

The image capturing device 704 can include some or all of the image capturing devices that were discussed with respect to method 100 above. As discussed above, in certain implementations, the system 700 includes sensors other than the image capturing device 704. For example, the system 704 may include a range sensor 728. If the system 700 includes a range sensor 728, the range sensor 728 can aid the image capturing device 704 in providing three-dimensional image data that describes the environment of the navigation system 700. In at least one implementation, the range sensor 728 includes an electronic distance measurement sensor, such as a LiDAR, a radar, and the like. In a further alternative embodiment, the system 700 may include other sensors that provide navigational data to the processing device 706. For example, the processing unit 706 may receive inertial measurement data from an inertial measurement unit 724. As one having skill in the art would recognize, the inertial measurement unit 724 provides inertial measurements associated with acceleration and rotation as measured by multiple accelerometers and gyroscopes. Further, the processing unit 706 may receive measurements from a global navigation satellite system (GNSS) receiver 722. The processing unit 706 can use the additional navigation information from the additional sensors to calculate a navigation solution for the system 700. In certain implementations, if a navigation solution is calculated, the processor 706 can provide the navigation solution to a human machine interface 726, where the human machine interface 726 can provide information derived from the calculated navigation solution to a user. In at least one implementation, the human machine interface 726 includes a display for displaying the information, a speaker for providing audio information, and/or an input device such as a keyboard, pointer, touch screen, etc. that allow the user to input information.

Example Embodiments

Example 1 includes a method for optimizing a set of matched features, the method comprising: matching features between an optical image and a geo-referenced orthoimage to produce an initial set of matched features; determining an initial position solution corresponding to the optical image using the initial set of N matched features; determining a set of N sub-solutions, wherein each of the N sub-solutions is a position solution using a different set of (N−1) matched features, wherein each set of (N−1) matched features is the initial set of N matched features having a different matched feature excluded therefrom; calculating a Z-score for each sub-solution in the set of N sub-solutions using the set of N sub-solutions as the population for the Z-score; calculating a residual for each sub-solution in the set of N sub-solutions having a Z-score above a Z-threshold, wherein each residual is based on a distance between a location of each feature in a set of features in the optical image and a predicted location of that feature according to a respective sub-solution for that residual; if any of the residuals are less than a residual threshold, excluding a matched feature corresponding to the sub-solution for that residual from the set of N matched features to produce an optimized set of matched features, wherein the matched feature corresponding to the sub-solution is the matched feature that was excluded from the set of N matched features when determining that sub-solution; and determining a refined position solution corresponding to the optical image using the optimized set of matched features.

Example 2 includes the method of Example 1, wherein calculating a Z-score for each sub-solution includes calculating a Z-score for a respective sub-solution based on the 2-dimensional position solution of that respective sub-solution in the set of N sub-solutions.

Example 3 includes the method of any of Examples 1-2, wherein calculating a residual for each sub-solution includes calculating a median of a set of distances, wherein the set of distances includes the distance between the location of each feature in the set of features in the optical image and the predicted location of that feature according to the respective sub-solution in the set of N sub-solutions.

Example 4 includes the method of any of Examples 1-3, wherein the residual threshold is based on a residual of the initial position solution.

Example 5 includes the method of any of Examples 1-4, wherein the set of features used to calculate a residual is the set of N−1 matched features.

Example 6 includes the method of any of Examples 1-5, comprising: capturing the optical image using an image capturing device mounted on a vehicle, wherein the initial position solution and the refined position solution are respective position solutions for the vehicle.

Example 7 includes the method of Example 6, wherein determining the initial position solution includes determining the initial position solution based on a navigation solution from a previous iteration of a vision-aided navigation solution algorithm.

Example 8 includes the method of any of Examples 1-7, wherein determining an initial position solution, determining a set of N sub-solutions, and determining a refined position solution, use the perspective-n-point algorithm.

Example 9 includes a system for optimizing a set of matched features, the system comprising: one or more processing devices; one or more data storage devices configured to store geo-referenced orthoimagery, wherein the one or more data storage devices are coupled to the one or more processing devices and including instructions which, when executed by the one or more processing devices, cause the one or more processing devices to: match features between an optical image and a geo-referenced orthoimage to produce an initial set of matched features; determine an initial position solution corresponding to the optical image using the initial set of N matched features; determine a set of N sub-solutions, wherein each of the N sub-solutions is a position solution using a different set of (N−1) matched features, wherein each set of (N−1) matched features is the initial set of N matched features having a different matched feature excluded therefrom; calculate a Z-score for each sub-solution in the set of N sub-solutions using the set of N sub-solutions as the population for the Z-score; calculate a residual for each sub-solution in the set of N sub-solutions having a Z-score above a Z-threshold, wherein each residual is based on a distance between a location of each feature in a set of features in the optical image and a predicted location of that feature according to a respective sub-solution for that residual; if any of the residuals are less than a residual threshold, exclude a matched feature corresponding to the sub-solution for that residual from the set of N matched features to produce an optimized set of matched features, wherein the matched feature corresponding to the sub-solution is the matched feature that was excluded from the set of N matched features when determining that sub-solution; and determine a refined position solution corresponding to the optical image using the optimized set of matched features.

Example 10 includes the system of Example 9, wherein calculate a Z-score for each sub-solution includes calculate a Z-score for a respective sub-solution based on the 2-dimensional position solution of that respective sub-solution in the set of N sub-solutions.

Example 11 includes the system of any of Examples 9-10, wherein calculate a residual for each sub-solution includes calculate a median of a set of distances, wherein the set of distances includes the distance between the location of each feature in the set of features in the optical image and the predicted location of that feature according to the respective sub-solution in the set of N sub-solutions.

Example 12 includes the system of any of Examples 9-11, wherein the residual threshold is based on a residual of the initial position solution.

Example 13 includes the system of any of Examples 9-12, wherein the set of features used to calculate a residual is the set of N−1 matched features.

Example 14 includes the system of any of Examples 9-13, comprising: at least one image capturing device configured to capture the optical image, wherein the initial position solution and the refined position solution are respective position solutions for the at least one image capturing device.

Example 15 includes the system of Example 14, wherein determine the initial position solution includes determine the initial position solution based on a navigation solution from a previous iteration of a vision-aided navigation solution algorithm.

Example 16 includes the system of any of Examples 9-15, wherein determining an initial position solution, determining a set of N sub-solutions, and determining a refined position solution, use the perspective-n-point algorithm.

Example 17 includes a program product comprising a computer readable medium on which program instructions are embodied, wherein the program instructions are configured, when executed by at least one programmable processor, to cause the at least one programmable processor to: match features between an optical image and a geo-referenced orthoimage to produce an initial set of matched features; determine an initial position solution corresponding to the optical image using the initial set of N matched features; determine a set of N sub-solutions, wherein each of the N sub-solutions is a position solution using a different set of (N−1) matched features, wherein each set of (N−1) matched features is the initial set of N matched features having a different matched feature excluded therefrom; calculate a Z-score for each sub-solution in the set of N sub-solutions using the set of N sub-solutions as the population for the Z-score; calculate a residual for each sub-solution in the set of N sub-solutions having a Z-score above a Z-threshold, wherein each residual is based on a distance between a location of each feature in a set of features in the optical image and a predicted location of that feature according to a respective sub-solution for that residual; if any of the residuals are less than a residual threshold, exclude a matched feature corresponding to the sub-solution for that residual from the set of N matched features to produce an optimized set of matched features, wherein the matched feature corresponding to the sub-solution is the matched feature that was excluded from the set of N matched features when determining that sub-solution; and determine a refined position solution corresponding to the optical image using the optimized set of matched features.

Example 18 includes the program product of Example 17, wherein the residual threshold is based on a residual of the initial position solution.

Example 19 includes the program product of any of Examples 17-18, wherein the set of features used to calculate a residual is the set of N−1 matched features.

Example 20 includes the program product of any of Examples 17-19, wherein determine the initial position solution includes determine the initial position solution based on a navigation solution from a previous iteration of a vision-aided navigation solution algorithm.

What is claimed is:

1. A method for optimizing a set of matched features, the method comprising:
    matching features between an optical image and a geo-referenced orthoimage to produce an initial set of matched features;
    determining an initial position solution corresponding to the optical image using the initial set of N matched features;
    determining a set of N sub-solutions, wherein each of the N sub-solutions is a position solution using a different set of (N−1) matched features, wherein each set of (N−1) matched features is the initial set of N matched features having a different matched feature excluded therefrom;

calculating with a processing device a Z-score for each sub-solution in the set of N sub-solutions using the set of N sub-solutions as the population for the Z-score;

calculating with the processing device a residual for each sub-solution in the set of N sub-solutions having a Z-score above a Z-threshold, wherein each residual is based on a distance between a location of each feature in a set of features in the optical image and a predicted location of that feature according to a respective sub-solution for that residual;

if any of the residuals are less than a residual threshold, excluding a matched feature corresponding to the sub-solution for that residual from the set of N matched features to produce an optimized set of matched features, wherein the matched feature corresponding to the sub-solution is the matched feature that was excluded from the set of N matched features when determining that sub-solution; and determining a refined position solution corresponding to the optical image using the optimized set of matched features.

2. The method of claim 1, wherein calculating a Z-score for each sub-solution includes calculating a Z-score for a respective sub-solution based on the 2-dimensional position solution of that respective sub-solution in the set of N sub-solutions.

3. The method of claim 1, wherein calculating a residual for each sub-solution includes calculating a median of a set of distances, wherein the set of distances includes the distance between the location of each feature in the set of features in the optical image and the predicted location of that feature according to the respective sub-solution in the set of N sub-solutions.

4. The method of claim 1, wherein the residual threshold is based on a residual of the initial position solution.

5. The method of claim 1, wherein the set of features used to calculate a residual is the set of N−1 matched features.

6. The method of claim 1, comprising:
capturing the optical image using an image capturing device mounted on a vehicle,
wherein the initial position solution and the refined position solution are respective position solutions for the vehicle.

7. The method of claim 6, wherein determining the initial position solution includes determining the initial position solution based on a navigation solution from a previous iteration of a vision-aided navigation solution algorithm.

8. The method of claim 1, wherein determining an initial position solution, determining a set of N sub-solutions, and determining a refined position solution, use the perspective-n-point algorithm.

9. A system for optimizing a set of matched features, the system comprising:
one or more processing devices;
one or more data storage devices configured to store geo-referenced orthoimagery, wherein the one or more data storage devices are coupled to the one or more processing devices and including instructions which, when executed by the one or more processing devices, cause the one or more processing devices to:
match features between an optical image and a geo-referenced orthoimage to produce an initial set of matched features;
determine an initial position solution corresponding to the optical image using the initial set of N matched features;
determine a set of N sub-solutions, wherein each of the N sub-solutions is a position solution using a different set of (N−1) matched features, wherein each set of (N−1) matched features is the initial set of N matched features having a different matched feature excluded therefrom;
calculate a Z-score for each sub-solution in the set of N sub-solutions using the set of N sub-solutions as the population for the Z-score;
calculate a residual for each sub-solution in the set of N sub-solutions having a Z-score above a Z-threshold, wherein each residual is based on a distance between a location of each feature in a set of features in the optical image and a predicted location of that feature according to a respective sub-solution for that residual;
if any of the residuals are less than a residual threshold, exclude a matched feature corresponding to the sub-solution for that residual from the set of N matched features to produce an optimized set of matched features, wherein the matched feature corresponding to the sub-solution is the matched feature that was excluded from the set of N matched features when determining that sub-solution; and
determine a refined position solution corresponding to the optical image using the optimized set of matched features.

10. The system of claim 9, wherein calculate a Z-score for each sub-solution includes calculate a Z-score for a respective sub-solution based on the 2-dimensional position solution of that respective sub-solution in the set of N sub-solutions.

11. The system of claim 9, wherein calculate a residual for each sub-solution includes calculate a median of a set of distances, wherein the set of distances includes the distance between the location of each feature in the set of features in the optical image and the predicted location of that feature according to the respective sub-solution in the set of N sub-solutions.

12. The system of claim 9, wherein the residual threshold is based on a residual of the initial position solution.

13. The system of claim 9, wherein the set of features used to calculate a residual is the set of N−1 matched features.

14. The system of claim 9, comprising:
at least one image capturing device configured to capture the optical image,
wherein the initial position solution and the refined position solution are respective position solutions for the at least one image capturing device.

15. The system of claim 14, wherein determine the initial position solution includes determine the initial position solution based on a navigation solution from a previous iteration of a vision-aided navigation solution algorithm.

16. The system of claim 9, wherein determining an initial position solution, determining a set of N sub-solutions, and determining a refined position solution, use the perspective-n-point algorithm.

17. A system comprising at least one programmable processor programmed to:
match features between an optical image and a geo-referenced orthoimage to produce an initial set of matched features;
determine an initial position solution corresponding to the optical image using the initial set of N matched features;
determine a set of N sub-solutions, wherein each of the N sub-solutions is a position solution using a different set of (N−1) matched features, wherein each set of (N−1)

matched features is the initial set of N matched features having a different matched feature excluded therefrom;

calculate a Z-score for each sub-solution in the set of N sub-solutions using the set of N sub-solutions as the population for the Z-score;

calculate a residual for each sub-solution in the set of N sub-solutions having a Z-score above a Z-threshold, wherein each residual is based on a distance between a location of each feature in a set of features in the optical image and a predicted location of that feature according to a respective sub-solution for that residual;

if any of the residuals are less than a residual threshold, exclude a matched feature corresponding to the sub-solution for that residual from the set of N matched features to produce an optimized set of matched features, wherein the matched feature corresponding to the sub-solution is the matched feature that was excluded from the set of N matched features when determining that sub-solution; and determine a refined position solution corresponding to the optical image using the optimized set of matched features.

18. The system of claim 17, wherein the residual threshold is based on a residual of the initial position solution.

19. The system of claim 17, wherein the set of features used to calculate a residual is the set of N−1 matched features.

20. The system of claim 17, wherein determine the initial position solution includes determine the initial position solution based on a navigation solution from a previous iteration of a vision-aided navigation solution algorithm.

* * * * *